United States Patent [19]

Rozman et al.

[11] Patent Number: 4,937,723

[45] Date of Patent: Jun. 26, 1990

[54] VSCF SYSTEM WITH AN OVERLOAD PROTECTION

[75] Inventors: Gregory I. Rozman; T. M. Cheng, both of Rockford, Ill.

[73] Assignee: Sundstrand Corporation, Rockford, Ill.

[21] Appl. No.: 351,929

[22] Filed: May 15, 1989

[51] Int. Cl.$^5$ .............................................. H02H 7/00
[52] U.S. Cl. ......................................... 363/51; 363/37; 363/97; 363/132
[58] Field of Search ....................... 363/35, 37, 51, 78, 363/79, 97, 98, 131, 132

[56] References Cited

U.S. PATENT DOCUMENTS

| | | | |
|---|---|---|---|
| 4,167,037 | 9/1979 | Moerman | 363/79 |
| 4,264,951 | 4/1981 | Konishi et al. | 363/51 |
| 4,520,437 | 5/1985 | Boettcher, Jr. et al. | 363/98 |
| 4,527,226 | 7/1985 | Glennon | 363/79 |
| 4,666,020 | 5/1987 | Watanabe | 363/37 |

Primary Examiner—Peter S. Wong
Attorney, Agent, or Firm—Wood, Phillips, Mason, Recktenwald & VanSanten

[57] ABSTRACT

The problem of providing overload protection in a power generating system (10) is solved with an overload control (56) disclosed herein. The overload control (56) is used in connection with an inverter (50) which develops AC power at a select voltage level from a source (48) of DC power and includes an inverter switch controller (59) for developing switching signals to maintain inverter output voltage at the select voltage level. The overload control (56) includes an inverter output current sensor (66) and a current setpoint developing device (84). A logic control (92) is operatively associated with the inverter switch controller (59) for developing switching signals to control inverter output current if the actual inverter output current exceeds the desired inverter output current.

14 Claims, 3 Drawing Sheets

VSCF SYSTEM WITH AN OVERLOAD PROTECTION

FIELD OF THE INVENTION

This invention relates to electrical power systems and more particularly to a variable speed, constant frequence power system with overload protection.

BACKGROUND OF THE INVENTION

Conventional power generating systems control output voltage to maintain the same at or near a phase voltage reference level. Overload protection is typically obtained by sensing the phase current and reducing the phase voltage reference level if the phase current exceeds its rated value. The overcurrent characteristic curve is implemented in a look-up table. Such a conventional approach has three disadvantages. Namely, the overcurrent characteristics do not precisely limit power since power is a function of the power factor which varies with load. Also, the slope in the overcurrent characteristic curve determines the gain of the closed loop. Retuning the overcurrent characteristic would require retuning a compensation block. Finally, the gain around zero voltage reference is highly nonlinear which may cause instability when operating at this point.

The present invention is intended to overcome one or more of the problems as set forth above.

SUMMARY OF THE INVENTION

In accordance with the present invention, a power system employs closed loop current control when actual current exceeds a current reference value.

Broadly, there is disclosed herein a control for an inverter which develops AC power at a select voltage level from a source of DC power including an inverter switch controller for developing switching signals to maintain inverter output voltage at the select voltage level. An overload control comprises sensing means for generating a signal representing actual inverter output current and command means for developing a reference signal representing desired inverter output current. Control means are operatively associated with the inverter switch controller for developing switching signals to control inverter output current if the actual inverter output current exceeds the desired inverter output current.

It is a feature of the invention that the control means includes means for calculating a current error representing a difference between the actual inverter output current level and the desired inverter output current level.

It is another feature of the invention that the control includes means for limiting inverter output power.

According to another aspect of the invention, an inverter control comprises means for developing a current error, a voltage error, and a power error each representing a difference between actual and desired inverter output values. Logic means are coupled to the first, second and third developing means for selecting one of the current error, voltage error and power error. A control means is operatively coupled with the inverter and logic means for developing switching signals to control the inverter responsive to the selected error.

It is another feature of the invention that the logic means selects the lowest of the current error, the voltage error and the power error.

The disclosed control is used for a VSCF generating system which provides overload protection by employing power and current limiting in a closed loop configuration.

The generating system includes a prime mover which drives a synchronous generator and an exciter. The exciter supplies field power to the synchronous generator. Three phase AC power from the generator is rectified to DC power and connected through a DC link to a main inverter which inverts the power into constant frequency three phase AC power. The main inverter is controlled by a switch controller which may comprise a program lookup table for generating a stored switch pattern from a look-up table or a PWM generator. Signals from the switch controller are developed responsive to a control signal received from a VSCF controller.

The VSCF controller receives signals representing current at the point of regulation and voltage at the point of regulation. The sensed current is compared to a current reference to develop a current error which is compensated and supplied to selection logic. The sensed voltage is compared to a voltage reference to develop a voltage error which is compensated and is also applied to the selection logic. Finally, the sensed current and voltage are applied to a power detector to determine instantaneous power which is compared to a power reference to develop a power error which is compensated and also applied to the selection logic. The selection logic outputs the lowest of the three compensated error signals which output is provided as the control signal to the pattern generator.

In operation, the system is intended to control voltage to maintain point of regulation voltage at, for example, 115 volts. If the load current increases, then current error becomes negative so that the selection logic operates off of current error to control current rather than voltage. Power limiting is normally provided by changing the power reference.

Further features and advantages of the invention will readily be apparent from the specification and from the drawings.

Description of the Invention

Figure 1:
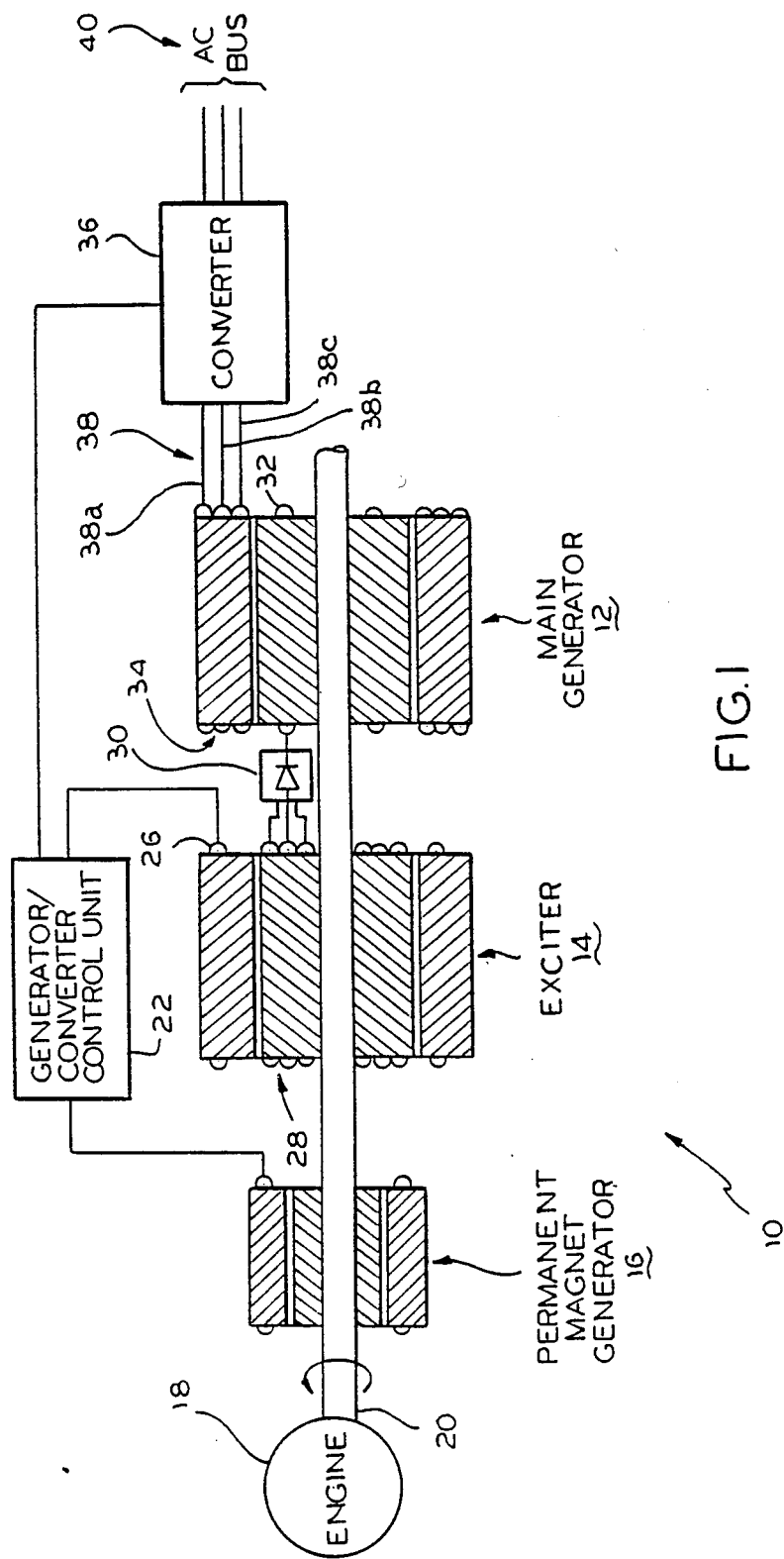
FIG. 1 is a combined diagrammatic illustration-block diagram of a variable speed, constant frequency power system with overload protection according to the invention.

Referring first to FIG. 1, an electrical power system 10 includes a main generator 12, an AC exciter 14 for providing main field current to the generator 12 and a permanent magnet generator (PMG) 16. Each of the main generator 12, exciter 14 and PMG 16 are driven by an engine 18 through a common shaft 20.

A generator/converter control unit (GCCU) 22 receives the power developed by the PMG 16 and delivers a controlled current to a field winding 26 of the exciter 14. As is conventional in brushless power systems, rotation of the shaft 20 by the engine 18 results in generation of a polyphase voltage in armature windings 28 of the exciter 14. This polyphase voltage is rectified by a rectifier bridge, illustrated generally at 30, and the rectified power is coupled to a field winding 32 of the main generator 12. The current in the field winding 32 and the rotation of the shaft 20 sets up a rotating magnetic field in space occupied by a set of main generator stator windings, or stator coil, 34. The stator windings 34 develop polyphase output power which is delivered to a converter 36 over a bus 38 comprising at least three conductors 38a, 38b and 38c. The polyphase output power developed by the main generator 12 has a frequency which varies with rotor speed, and is commonly referred to as wild frequency power.

In a typical application, the engine 18 is the main engine in an aircraft, and the converter 36 is part of a variable speed, constant frequency (VSCF) system for delivering constant frequency power to an AC bus 40 for powering aircraft loads 42, as controlled by the GCCU 22.

Figure 2:
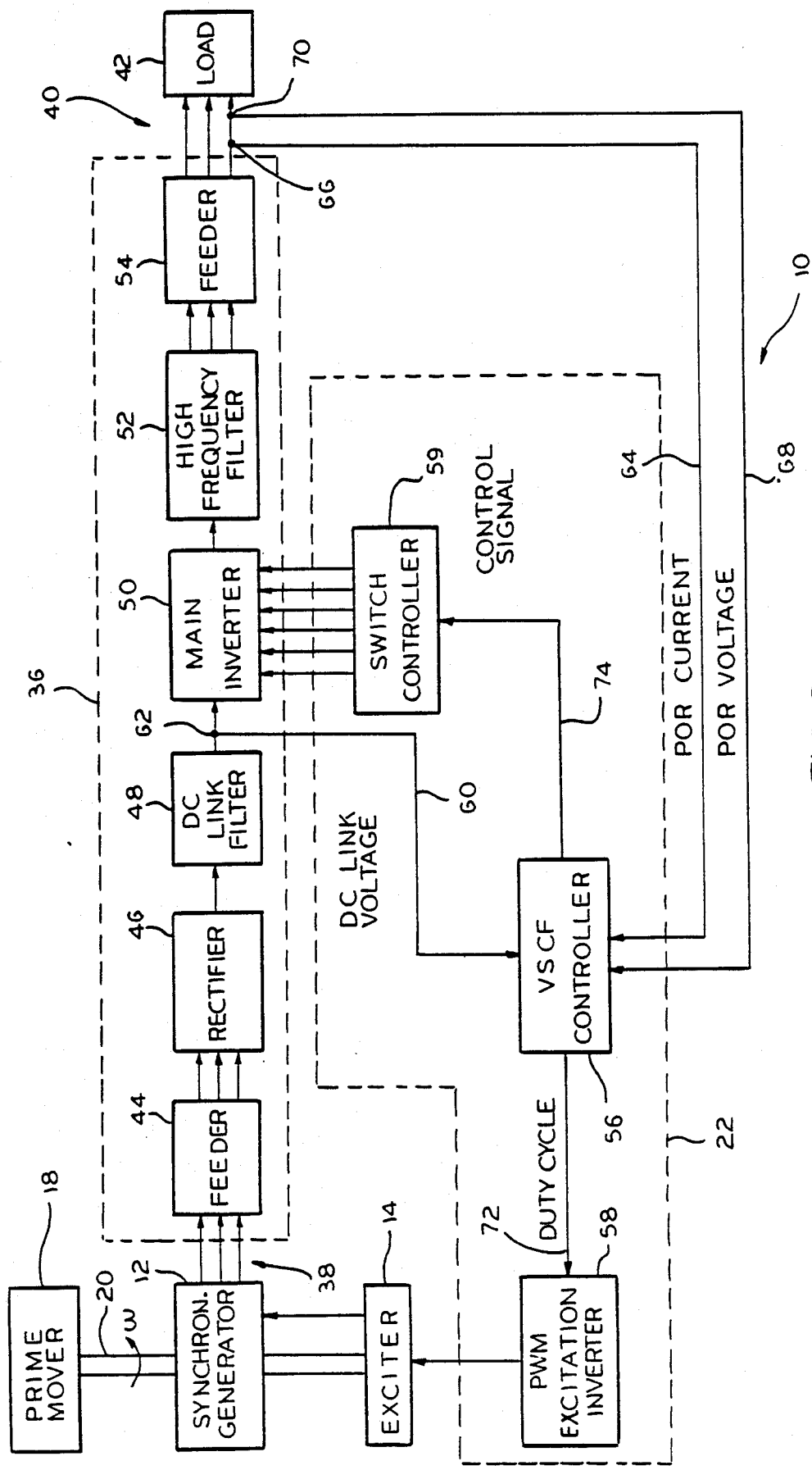
FIG. 2 is a more detailed block diagram particularly illustrating both the GCCU and the converter of FIG. 1.

Referring now to FIG. 2, the electrical power system 10 is illustrated in greater detail in block diagram form.

The converter 36 includes an input feeder 44, an AC/DC converter 46 connected by a DC link 48 to a DC/AC converter 50, which is connected to a high frequency filter 52 and to an output feeder 54 which deliver power to the bus 40.

Particularly, according to the illustrative embodiment of the invention, the AC/DC converter 46 comprises a full wave bridge rectifier circuit of conventional construction which is operable to convert three phase AC power to DC power. The DC link 48 includes a conventional filter. The DC/AC converter 50 comprises a main inverter circuit. The main inverter circuit 50 may comprise, for example, a voltage source inverter having six power switch circuits connected in three-phase bridge configuration.

The GCCU 22 includes a VSCF controller 56, a PWM excitation inverter 58 and a main inverrer switching controller 59. The VSCF controller 56 receives a DC link voltage signal on a line 60 from a DC link voltage sensor 62. Also, the VSCF controller 56 receives a point of reference (POR) current signal on a line 64 from an AC bus current sensor 66, and a POR voltage signal on a line 68 from an AC bus voltage sensor 70. The current sensor 66 and voltage sensor 70 may be of any known form which transmit signals representing inverter output current and voltage, respectively.

The PWM excitation inverter receives a duty cycle command on a line 72 from the VSCF controlled 56. The PWM excitation inverter 58 controls the exciter 14 to maintain a desired DC link voltage, as discussed below.

The VSCF controller 56 develops an output control signal on a line 74 connected to the switch controller 59. The switch controller 59 develops base drive commands for the switches of the main inverter 50. The switch controller 59 may comprise a pattern generator in the form of a look-up table with the control signal on the line 74 representing a pointer for the look-up table. Alternatively, the switch controller 59 may comprise a pulse width modulation generator with the control signal on the line 74 representing a duty cycle for the main inverter switches.

Figure 3:
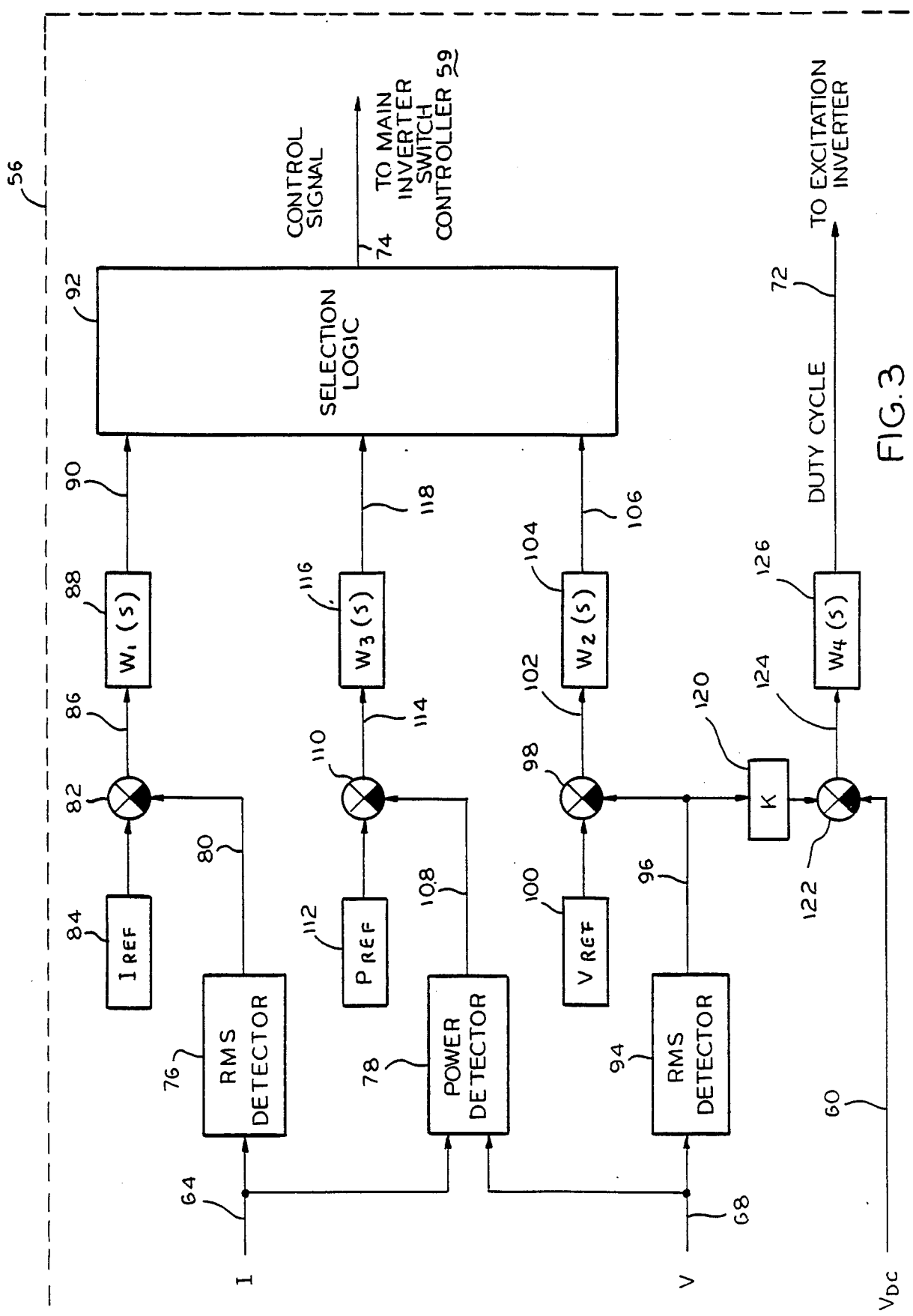
FIG. 3 is a detailed block diagram of the VSCF controller of FIG. 2.

Referring now to FIG. 3, the VSCF controller 56 is illustrated in greater detail in block diagram form.

The VSCF controller 56 receives the signals representing current and voltage at the point of regulation on the lines 64 and 68, respectively. The sensed current on the line 64 is applied to an RMS current detector 76 and to a power detector 78. The RMS current detector 76 develops an RMS current signal on a line 80, representing actual RMS output current, which is applied to a first summer 82. Also coupled to the summer 82 is a current setpoint block 84 which develops a current reference signal representing a desired RMS current output level. The setpoint block 84 could represent a stored register value or separately controlled variable, or a manually controlled parameter, as necessary, or desired. The output of the summer 82 is a current error on a line 86 which represents the difference between desired output current and the actual output current. The current error is applied to a first compensation block 88 which develops a compensated error signal on a line 90 which is transferred to a selection logic block 92.

The sensed point of regulation voltage on the line 68 is applied to an RMS voltage detector 94 and to the power detector 78. The RMS voltage detector 94 develops an RMS voltage signal on a line 96 representing actual RMS output voltage which is applied to a second summer 98. Also coupled to the second summer 98 is a voltage setpoint block 100, similar to the block 84, above, which develops a voltage reference command representing a desired RMS voltage level. The output of the second summer 98 is a voltage error on a line 102 representing the difference between the desired voltage and the actual voltage. The error signal is applied to a second compensation block 104 which develops a compensated error signal on a line 106 which is also coupled to the selection logic block 92.

The power detector 78 produces a signal on a line 108 representing actual instantaneous output power. The line 108 is connected to a third summer 110 which is also connected to a power setpoint block 112, similar to the block 84, above, which develops a power reference signal representing a desired output power level. The output of the third summer 110 is a power error on a line 114 representing the difference between the desired power and the actual power. The power error on the line 114 is compensated at a compensation block 116 which develops a compensated error signal on a line 118 which is also connected to the selection logic block 92.

The selection logic block 92 in the illustrated embodiment outputs the lowest of the three compensated error signals from the lines 90, 106 and 118 which output is provided as the control signal on the line 74 to the switch controller 59.

The line 96 from the RMS detector circuit 94 is connected to a gain block 120 which multiplies the RMS voltage signal by a constant which is applied to a fourth summer 122. The fourth summer 122 also receives the DC link voltage signal on the line 60 and develops a DC link voltage error signal on a line 124 which is applied to a fourth compensation block 126. The output of the fourth compensation block 126 is a compensated DC link error signal on the line 72 which is used to control the excitation inverter to maintain DC link voltage at a desired level.

In operation, the VSCF system is intended to control the voltage on the output bus 40 to maintain the point of regulation voltage at, for example, 115 volts RMS. Accordingly, under normal operating conditions, the control signal on the line 74 from the selection logic block 92 represents the compensated voltage error on the line 106. Thus, the switching controller 59 develops base drive commands to operate the main inverter 50 to develop the desired output voltage. If the load current increases, such as when an overload exits, then current error on the line 86 becomes negative so that the selection logic transfers the compensated current error received on the line 90 to the control signal line 74 so that the main inverter 50 is operated to control current rather than voltage. Specifically, closed loop current control is implemented under overcurrent conditions to provide overload protection.

The use of the power reference setpoint at the block 112 is provided for power limiting. Particularly, if it is necessary to limit output power, then the power reference can be lowered to effectively limit output power at a desired level. Specifically, if the power reference is decreased, then power error on line 114 immediately decreases so that the selection logic block transfers the compensated power error signal on the line 118 to the control signal line 74 so that the main inverter 50 is operated to control power rather than voltage. Specifically, closed loop power control is implemented under overpower conditions to provide further overload protection.

The GCCU 22 described herein is implemented in a software programmed microprocessor unit including suitable memory circuits, as is well known. Alternatively, the GCCU 22 described herein could be implemented with suitable electrical or electronic circuits.

Thus, the invention broadly comprehends a VSCF generating system which provides overload protection by employing power and current limiting in a closed loop configuration.

We claim:

1. In a control for an inverter which develops AC power at a select voltage level from a source of DC power including an inverter switch controller for developing switching signals to maintain inverter output voltage at the select voltage level, an overload control comprising:
    sensing means for generating a signal representing actual inverter output current;
    command means for developing a reference signal representing desired inverter output current; and
    control means operatively associated with said inverter switch controller for developing switching signals to control inverter output current if the actual inverter output current exceeds the desired inverter output current.

2. The overload control of claim 1 wherein said control means includes means for calculating a current error representing a difference between the actual inverter output current and the desired inverter output current.

3. The overload control of claim further comprising means for limiting inverter output power.

4. The overload control of claim 1 wherein said inverter switch controller comprises a pattern generator and said control means comprises means for selecting from one of a plurality of different switching patterns.

5. The overload control of claim 1 wherein said inverter switch controller comprises a pulse width modulation generator and said control means comprises means for selecting a duty cycle for said pulse width modulation generator.

6. A control for an inverter comprising:
    first developing means for developing a current error representing a difference between actual inverter output current and desired inverter output current;
    second developing means for developing a voltage error representing a difference between actual inverter output voltage and desired inverter output voltage;
    third developing means for developing a power error representing a difference between actual inverter output power and desired inverter output power;
    logic means coupled to said first, second and third developing means for selecting one of said current error, voltage error and power error; and
    control means operatively coupled with the inverter and said logic means for developing switching signals to control the inverter responsive to the selected error.

7. The control of claim 6 wherein said logic means selects the lowest of said current error, said voltage error and said power error.

8. The control of claim 6 wherein said control means comprises a pattern generator and means for selecting from one of a plurality of different switching patterns responsive to the selected error.

9. The control of claim 6 wherein said control means comprises a pulse width modulation generator and means for selecting a duty cycle for said pulse width modulation generator responsive to the selected error.

10. A control for a variable speed, constant frequency (VSCF) system having a generator which develops wild frequency AC output power, a rectifier for rectifying the generator AC output power to DC power on a DC link, and an inverter coupled to the DC link which is controlled to produce AC output power at a select frequency, comprising:
    voltage control means for developing inverter switching signals to maintain inverter output voltage at a desired voltage level;
    sensing means for generating a signal representing actual inverter output current;
    command means for developing a reference signal representing desired inverter output current; and
    control means operatively associated with said voltage control means for developing inverter switching signals to control inverter output current if the actual inverter output current exceeds the desired inverter output current.

11. The control of claim 10 wherein said control means includes means for calculating a current error representing a difference between the actual inverter output current and the desired inverter output current.

12. The control of claim 10 further comprising means for limiting inverter output power.

13. The control of claim 10 wherein said voltage control means comprises a pattern generator and said control means comprises means for selecting from one of a plurality of different switching patterns.

14. The control of claim 10 wherein said voltage control means comprises a pulse width modulation generator and said control means comprises means for selecting a duty cycle for said pulse width modulation generator.

* * * * *